(12) United States Patent
Li et al.

(10) Patent No.: US 9,163,658 B2
(45) Date of Patent: Oct. 20, 2015

(54) PARTS FOR CRANKSHAFT OF INTERNAL COMBUSTION ENGINE OR COMPRESSOR, CRANKSHAFT, INTERNAL COMBUSTION ENGINE AND COMPRESSOR

(75) Inventors: Ming Li, Beijing (CN); Zhengzhong Li, Beijing (CN)

(73) Assignee: BEIJING SINOCEP ENGINE TECHNOLOGY CO., LTD. (CN)

( * ) Notice: Subject to any disclaimer, the term of this patent is extended or adjusted under 35 U.S.C. 154(b) by 1144 days.

(21) Appl. No.: 13/121,232

(22) PCT Filed: Aug. 14, 2009

(86) PCT No.: PCT/CN2009/073259
§ 371 (c)(1),
(2), (4) Date: Mar. 28, 2011

(87) PCT Pub. No.: WO2010/051708
PCT Pub. Date: May 14, 2010

(65) Prior Publication Data
US 2011/0197705 A1    Aug. 18, 2011

(30) Foreign Application Priority Data

Nov. 10, 2008   (CN) .......................... 2008 1 0226417

(51) Int. Cl.
*F16C 3/10* (2006.01)
*F16C 3/12* (2006.01)
*F16C 3/14* (2006.01)

(52) U.S. Cl.
CPC ... *F16C 3/12* (2013.01); *F16C 3/14* (2013.01); *F16C 2226/60* (2013.01); *Y10T 74/2173* (2015.01)

(58) Field of Classification Search
CPC .......................................................... F16C 3/12
USPC .................................................. 74/595–598
See application file for complete search history.

(56) References Cited

U.S. PATENT DOCUMENTS

| | | | | | |
|---|---|---|---|---|---|
| 1,514,768 A | * | 11/1924 | Hirth | ............................... | 74/597 |
| 1,690,296 A | * | 11/1928 | Hirth | ............................... | 74/598 |

(Continued)

FOREIGN PATENT DOCUMENTS

| | | |
|---|---|---|
| CN | 85100358 A | 8/1986 |
| CN | 85100359 A | 8/1986 |

(Continued)

OTHER PUBLICATIONS

JPO Machine Translation of JP 3138083, Nov. 2007.*

(Continued)

*Primary Examiner* — Vinh Luong
(74) *Attorney, Agent, or Firm* — Cantor Colburn LLP

(57) ABSTRACT

A single bell crank for a crankshaft of an internal combustion engine or a compressor includes a single bell crank main journal (5, 28, 39) and a crank pin (21, 31, 46), wherein the crank pin (21, 31, 46) is vertical to the single bell crank main journal (5, 28, 39) and extends out, the axis of the crank pin (21, 31, 46) is offset relative to that of the single bell crank main journal (5, 28, 39), the front end of the crank pin (21, 31, 46) is tapered, at least one first positioning half hole (10-1) is provided on the circumference of the end face of the tapered end (9) and can match with a second positioning half hole (10-02) in a crank to form a positioning pin hole. A crank for a crankshaft of an internal combustion engine or a compressor includes a crank main journal (13, 52) provided with a taper hole (15, 59) matching with the tapered end (9) of the crank pin (21, 31, 46), wherein the axis of the taper hole (15, 59) is offset relative to that of the crank main journal (13, 52); the inner diameter surface of the taper hole (15, 59) is provided with the second positioning half hole (10-2) corresponding to the first positioning half hole (10-1) in the single bell crank matching with the taper hole (15, 59), and the second positioning half hole (10-2) and the first positioning half hole (10-1) can form a complete positioning hole after the single bell crank and the crank are assembled together.

11 Claims, 11 Drawing Sheets

(56) References Cited

U.S. PATENT DOCUMENTS

| | | | | |
|---|---|---|---|---|
| 1,775,054 A * | 9/1930 | Seegers | | 74/595 |
| 2,190,411 A * | 2/1940 | Mattison | | 74/597 |
| 2,359,306 A * | 10/1944 | Dusevoir | | 74/598 |
| 2,471,982 A * | 5/1949 | Shulda | | 74/597 |
| 2,566,785 A * | 9/1951 | Wheelis | | 74/597 |
| 4,515,495 A | 5/1985 | Trouillet | | |
| 2005/0268879 A1 | 12/2005 | Endoh | | |
| 2010/0064847 A1 * | 3/2010 | Henderson | | 74/595 |

FOREIGN PATENT DOCUMENTS

| | | | | |
|---|---|---|---|---|
| CN | 85100358 | | 1/1988 | |
| CN | 2066906 U | | 12/1990 | |
| CN | 1144879 A | | 3/1997 | |
| CN | 1144880 A | | 3/1997 | |
| CN | 2733072 | | 10/2005 | |
| CN | 101392789 A | | 3/2009 | |
| FR | 690609 | * | 9/1930 | 74/597 |
| FR | 887207 | | 11/1943 | |
| GB | 252251 | * | 5/1926 | 74/595 |
| GB | 399103 | * | 9/1933 | 74/597 |
| GB | 920385 | | 3/1963 | |
| JP | S48-25942 | | 7/1973 | |
| JP | H03-61135 U | | 6/1991 | |
| JP | 05073284 U | | 10/1993 | |
| JP | H07-035126 A | | 2/1995 | |
| JP | 11072121 A | | 3/1999 | |
| JP | 2006183677 A | | 7/2006 | |
| JP | 3138083 U | | 11/2007 | |
| WO | WO 2010/051843 | * | 5/2010 | F16C 3/12 |

OTHER PUBLICATIONS

Notification of Reason for Refusal for Japanese Patent Application No. 2011-534988; Date of Mailing: Jul. 2, 2013, with English Translation.

International Search Report PCT/CN2009/073259: Dated Nov. 19, 2009.

Second Japanese Office Action for the Patent Application No. 2011-534988, dated Apr. 8, 2014. English translation attached.

* cited by examiner

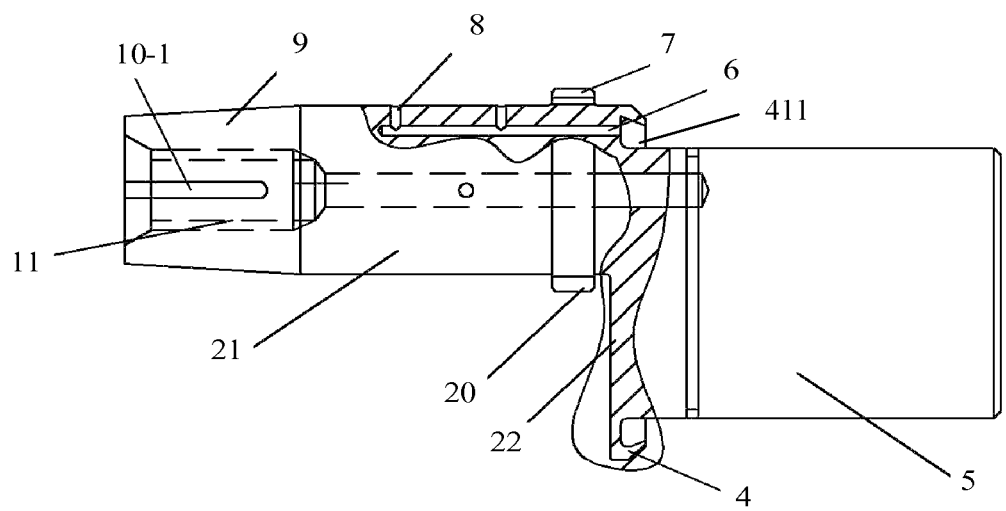
Fig. 1-A
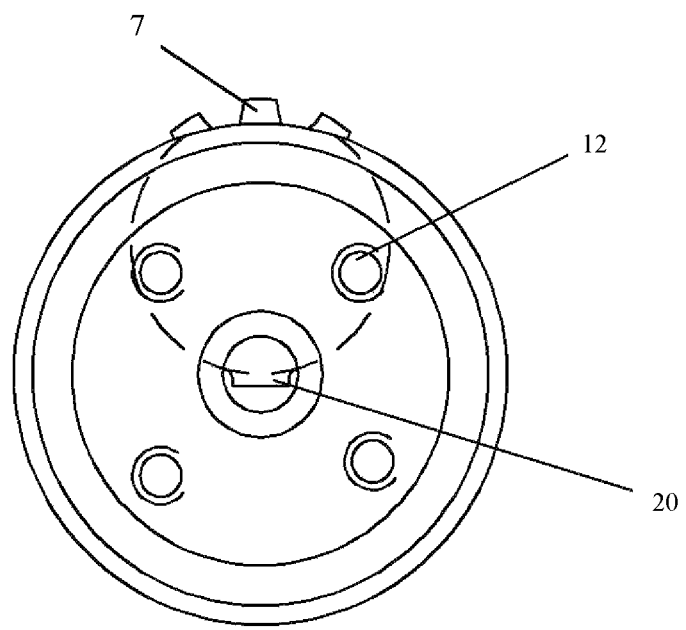
Fig. 1-B

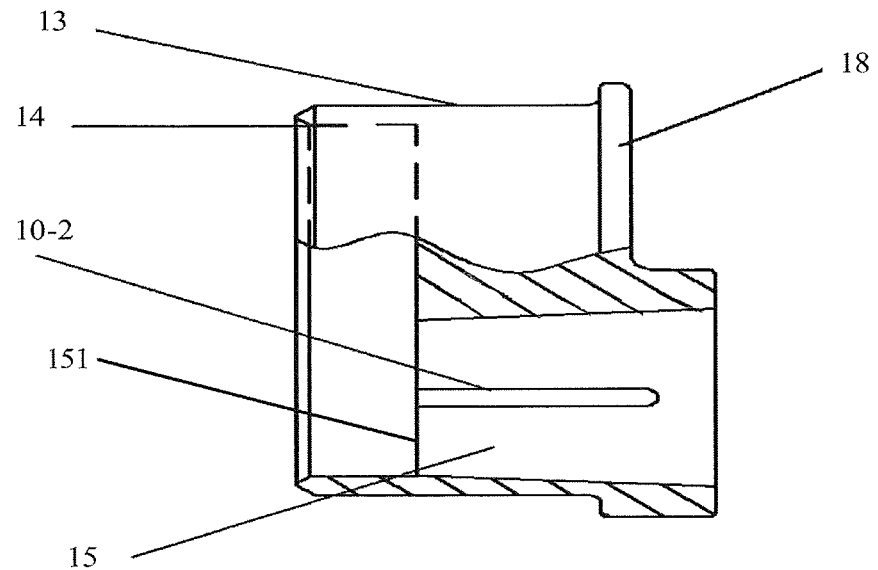
Fig. 1-C
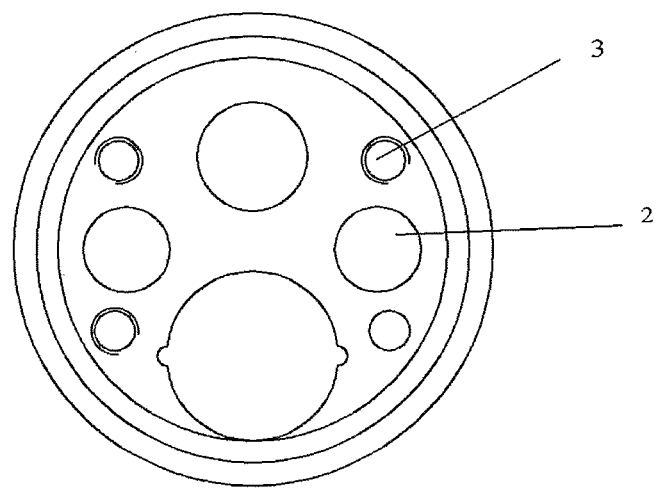
Fig. 1-D

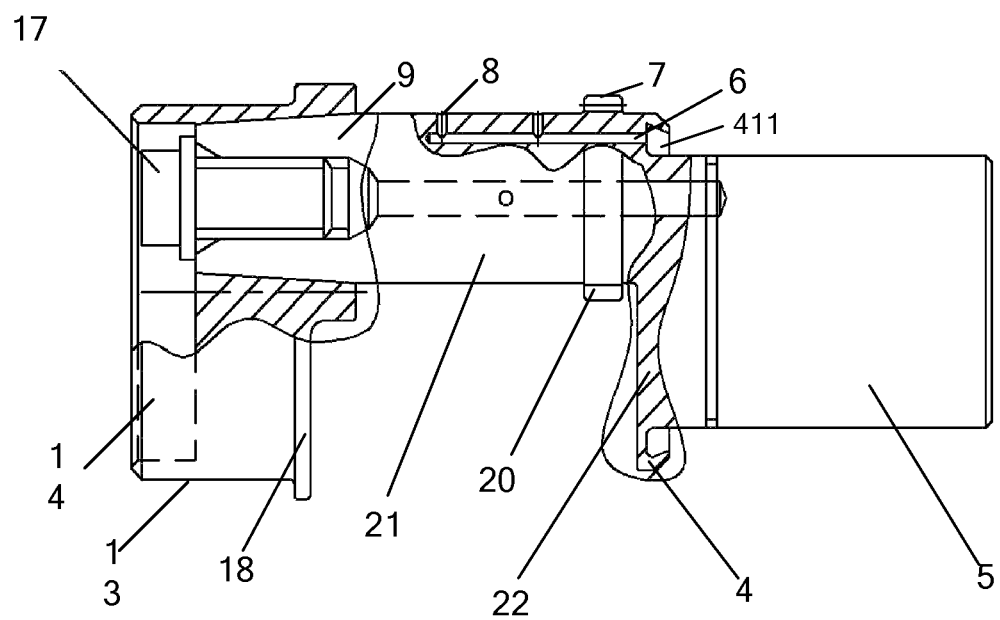
Fig. 1-E

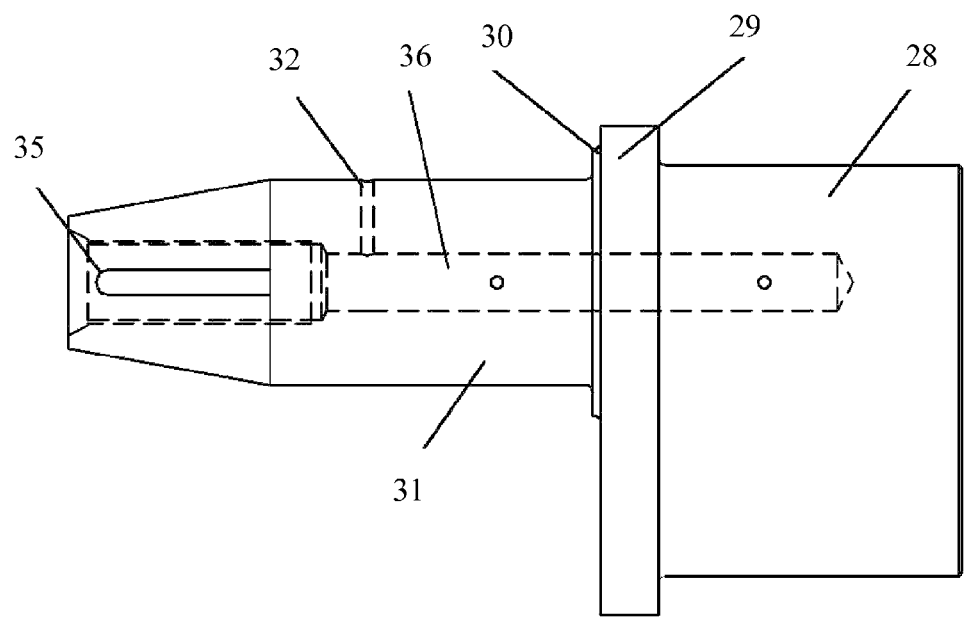
Fig. 2-A

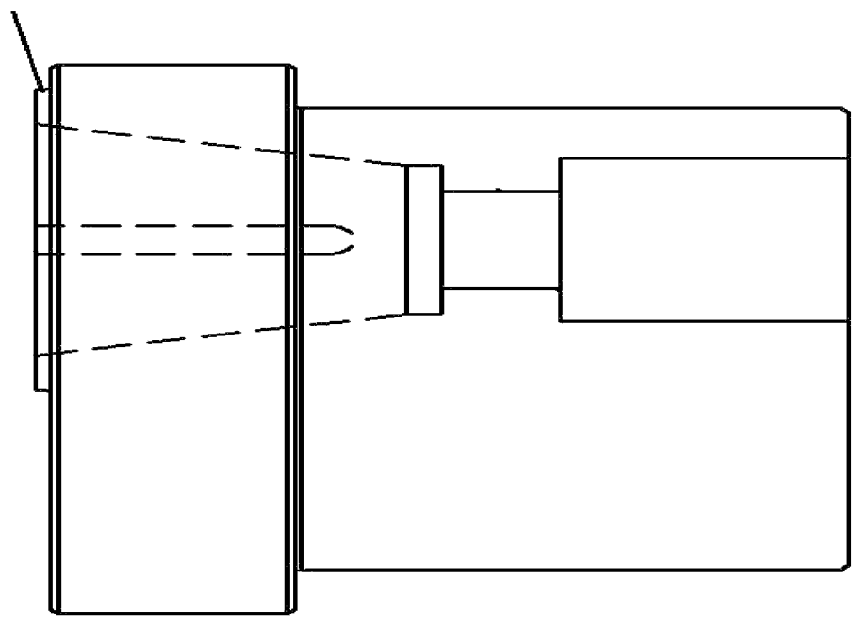
Fig. 2-B
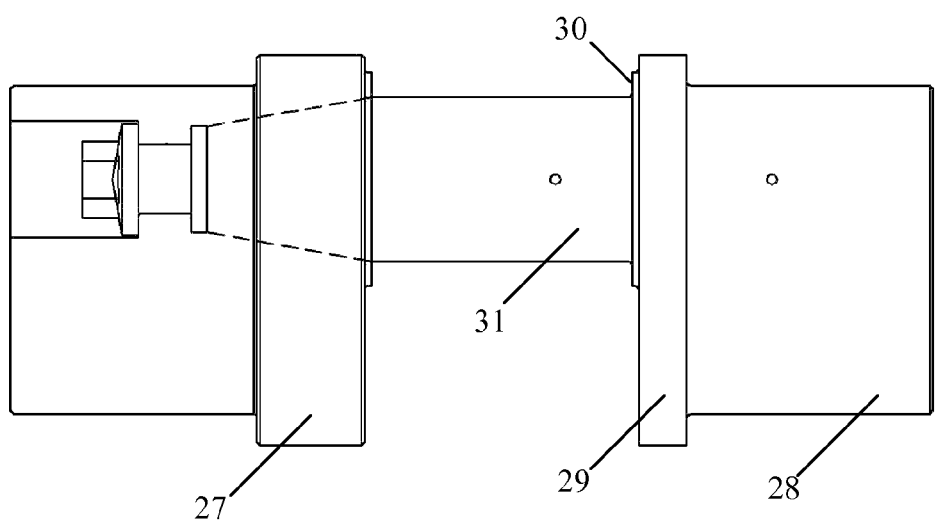
Fig. 2-C

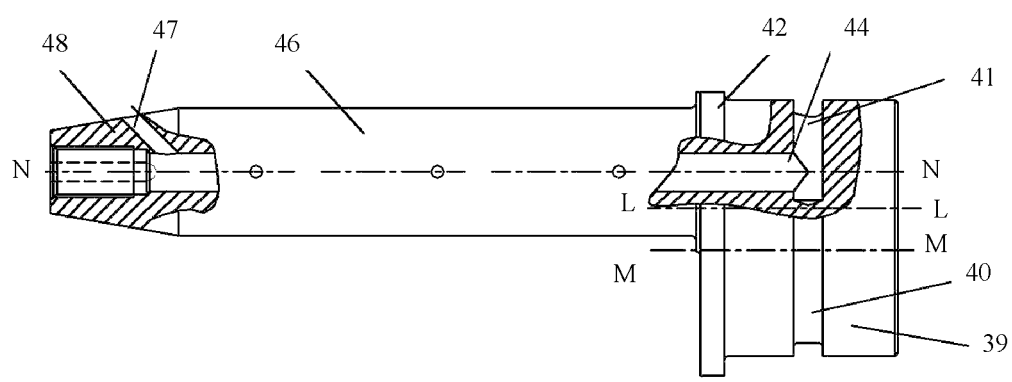
Fig. 3-A
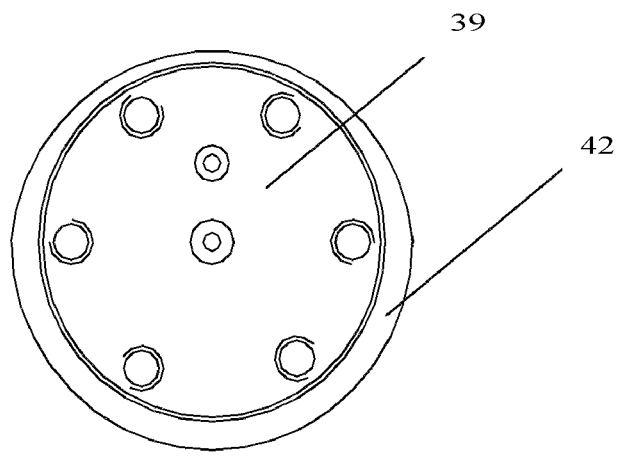
Fig. 3-B

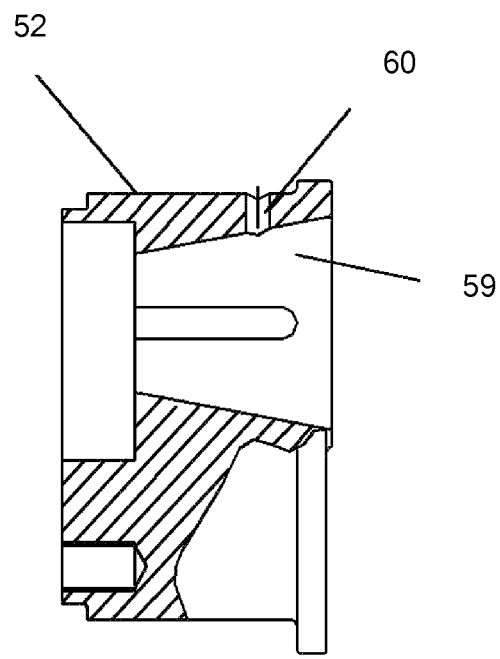
Fig. 3-C
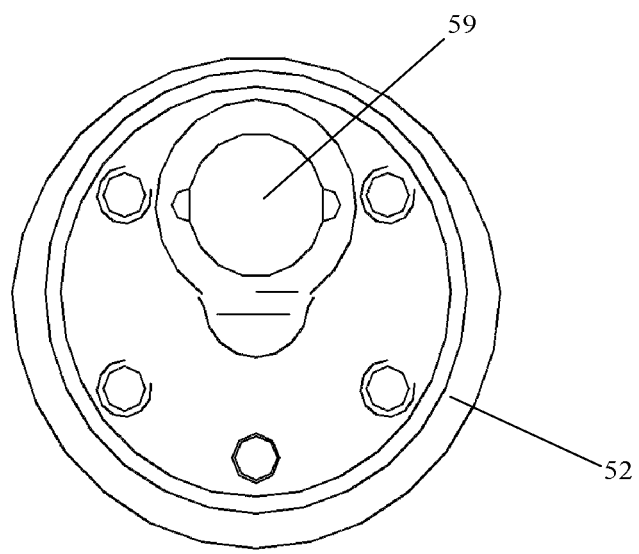
Fig. 3-D

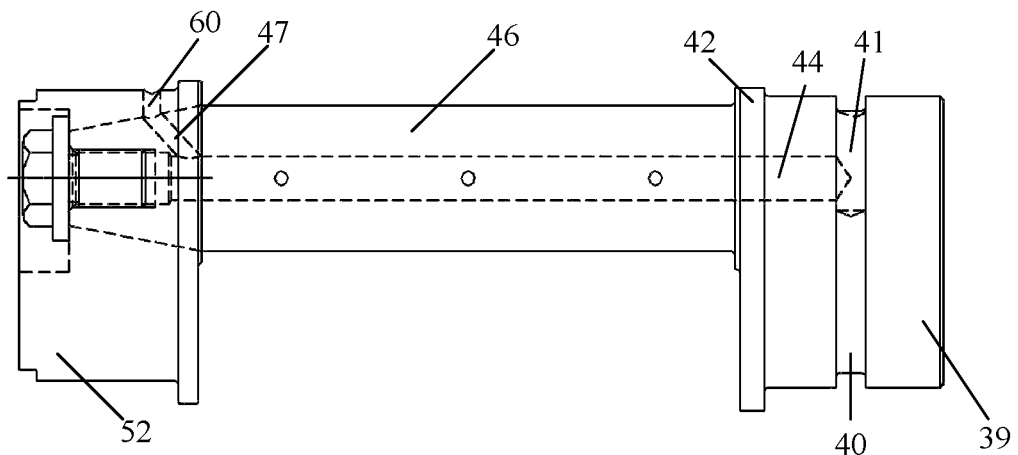
Fig. 3-E
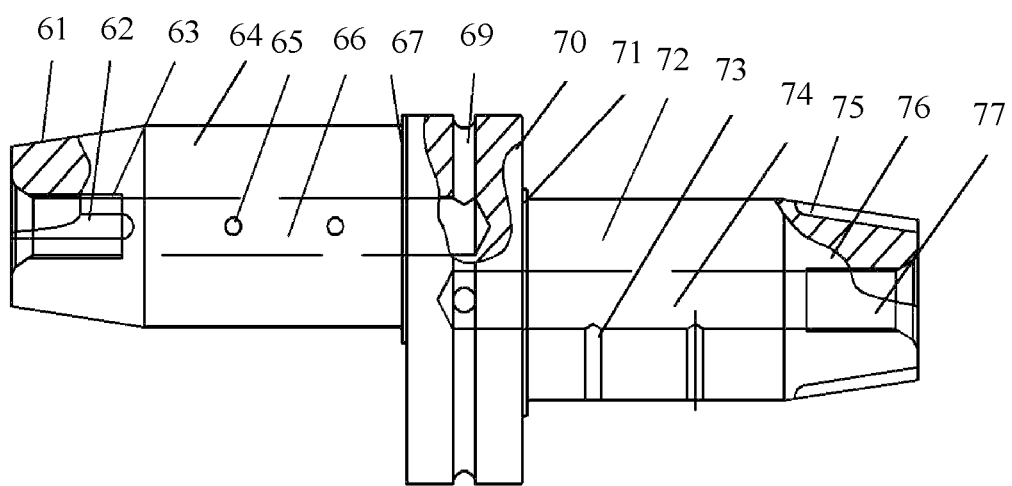
Fig. 4-A

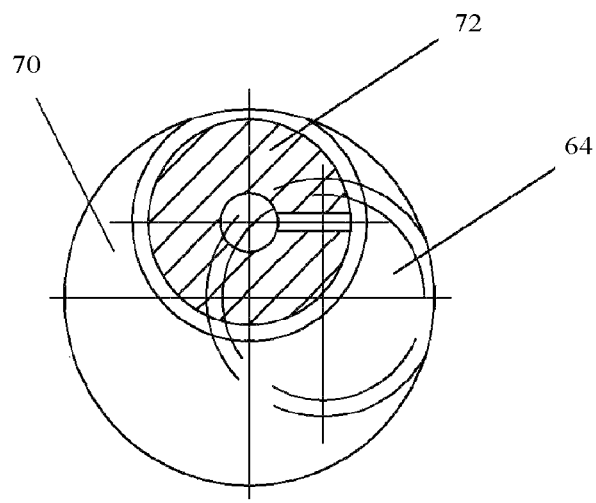
Fig. 4-B
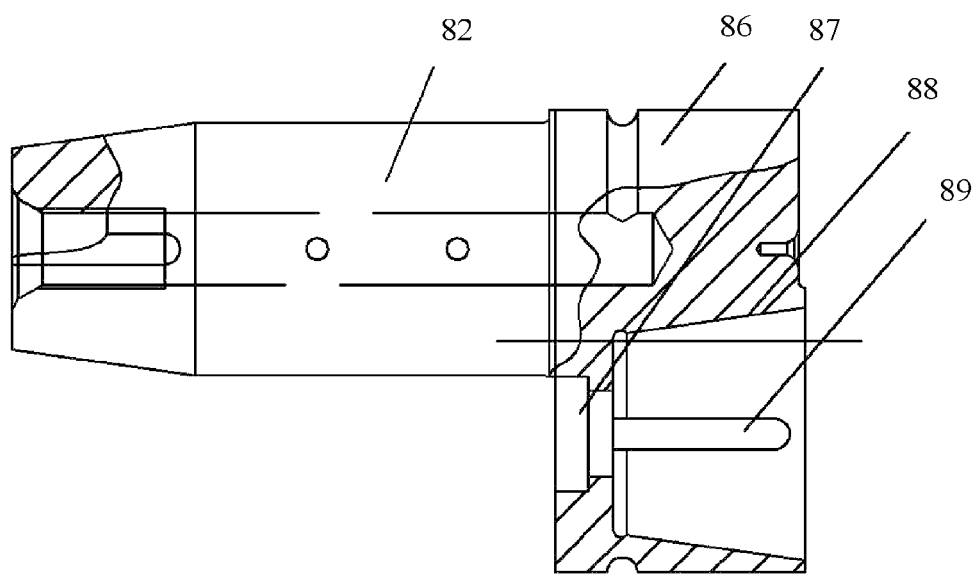
Fig. 4-C

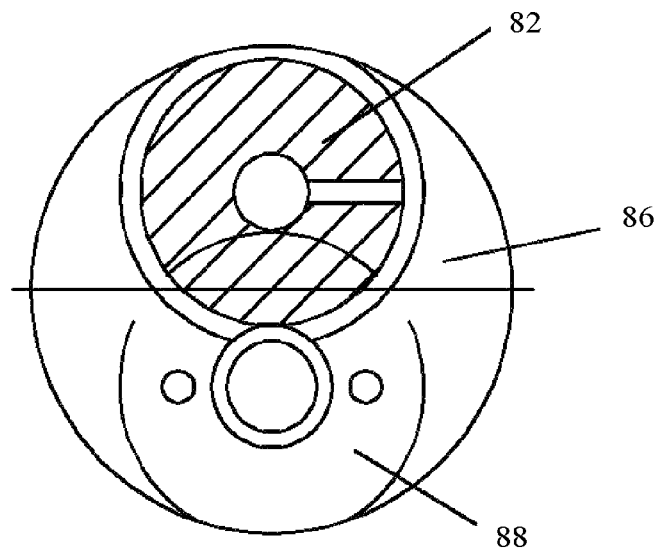
Fig. 4-D
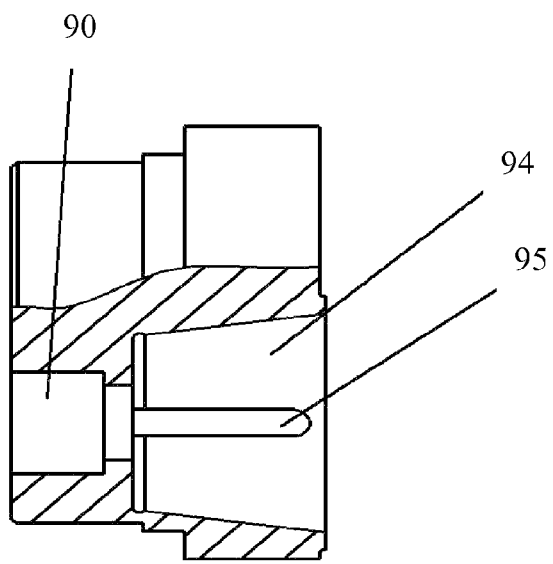
Fig. 4-E

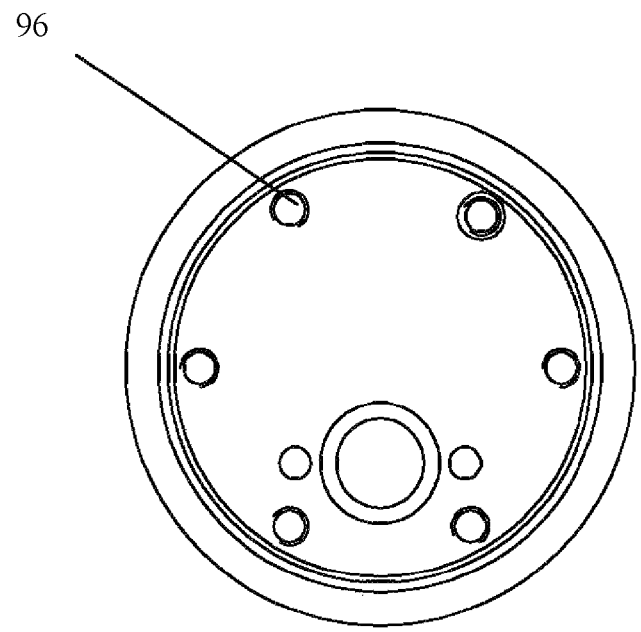
Fig. 4-F
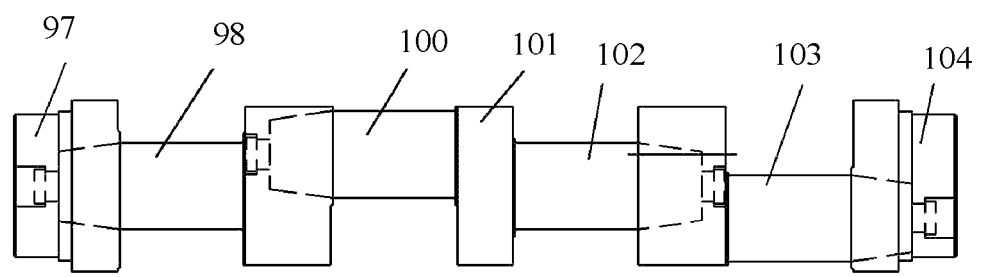
Fig. 4-G

PARTS FOR CRANKSHAFT OF INTERNAL COMBUSTION ENGINE OR COMPRESSOR, CRANKSHAFT, INTERNAL COMBUSTION ENGINE AND COMPRESSOR

CROSS REFERENCE TO RELATED APPLICATION

This application claims priority from Chinese Patent Application No. 200810226417.4, entitled "PARTS FOR CRANKSHAFT OF INTERNAL COMBUSTION ENGINE OR COMPRESSOR, CRANKSHAFT, INTERNAL COMBUSTION ENGINE AND COMPRESSOR" filed with the Chinese Patent Office on Nov. 10, 2008, which is hereby incorporated by reference in its entirety.

FIELD OF THE INVENTION

The present invention relates to a crankshaft of an engine or compressor, in particular, to parts for crankshaft of crank circular slide block type internal combustion engine or compressor, and to a crankshaft constituted by the parts. The invention also provides an internal combustion engine and a compressor comprising the above-described crankshaft.

BACKGROUND OF THE INVENTION

In a reciprocating type internal combustion engine or compressor, a conversion between a reciprocating motion of a piston and a rotary motion of a crankshaft is required to be realized, wherein the reciprocating motion of the piston is converted into the rotary motion of the crankshaft in the reciprocating type internal combustion engine, while the rotary motion of the crankshaft is converted into the reciprocating motion of the piston in the reciprocating type compressor. In current known technologies, the above-described conversion requires the use of a crank-link mechanism. The machine becomes bulky and heavy due to the existence of links in the crank-link mechanism, making it impossible to a complete balance.

In order to solve the above discussed problem, Chinese patent CN85100359A discloses a "reciprocating piston type internal combustion engine with crank-dual circular slide block", Chinese patent ZL95111404.2 protects a "reciprocating piston type internal combustion engine with crank-dual circular slide block", and Chinese patent ZL95111403.4 protects a "reciprocating piston type internal combustion engine with crank-multiple circular slide block". A common feature of the above internal combustion engines is that a thorough improvement is made on the crank-link mechanism of internal combustion engine in known technologies, by use of substituting the link with a circular slide block having an eccentric circular hole. The eccentric circular slide block is of a cylinder shape and is provided with an eccentric circular hole which is in parallel with the axis of the cylinder and passed through by a crank pin of the crankshaft. A piston of the internal combustion engine includes crown portions at both ends thereof and a guide portion connecting the crown portions, wherein the guide portion is provided with a circular hole thereon whose inside diameter surface matches with an outside diameter surface of the circular slide block so that the circular slide block is placed into the circular hole of the guide portion of the piston which matches with the outer periphery of the circular slide block. When the piston reciprocates in the cylinder under the push of combusted gas in the cylinder, the eccentric circular slide block rotates about its own center of circle and further drives the crankshaft to rotate in an opposite direction, so that the reciprocating motion of the piston is converted into the rotary motion of the crankshaft and then power is transmitted outwardly by rotating parts connected to the crankshaft. The ideas of the above patents can also be conveniently applied to a compressor to obtain a crank circular slide block compressor.

In the above discussed crank circular slide block type internal combustion engine or compressor, the crankshaft remains to be an indispensable part. The crankshaft has a main journal and a crank pin, wherein the main journal is used for supporting the crankshaft on the cylinder body by means of a bearing, and the crank pin passes through the eccentric circular hole of the circular slide block. Since the diameter of the main journal is larger than that of the crank pin, the main journal at both ends will necessarily completely enclose the left and right sides of the axis of the crank pin. Therefore, the problem with how to fit the circular slide block over the crank pin must be taken into consideration.

One of the ways to solve the above problem is to design the circular slide block as a split structure, i.e., the circular slide block is divided into two halves: a left part and a right part that are semi-circle respectively. Upon installation, the left part and the right part fit over the crank pin by facing them each other, and then bringing the two parts into an integral part by means of a lock-up structure. Although this method can solve the above problem, the circular slide block itself is small in size and the eccentric circular hole is also required to be provided, making the space for arranging the lock up structure limited. Besides, the circular slide block is subject to a very large force when the engine is in operation, therefore the lock up structure tends to fail. Therefore, this kind of circular slide block having split structure is not an optimum solution.

SUMMARY OF THE INVENTION

In view of the above problem, the technical problem to be solved by the invention is to provide parts for crankshaft of an internal combustion engine or compressor, which cooperate with each other to form the crankshaft. The crankshaft formed by such a combination facilitates a convenient installation of the circular slide block on the crank pin, is easy to manufacture and assemble, is fixed firmly, and is insusceptible to fail. Moreover, the phase relationships between/among the parts remain unchanged after they are disassembled and re-assembled. The invention also provides an internal combustion engine and compressor using the above crankshaft.

The parts for crankshaft of an internal combustion engine or compressor provided by the invention include two portions of a single throw main journal and a crank pin, wherein the crank pin extends out perpendicularly to the single throw main journal and has an axis that is offset relative to the axis of the main journal of the crankshaft, a front end that is tapered, at least one first positioning semi-hole is provided on a conical surface of the tapered end, starting from a small diameter end or a large diameter end. The first positioning semi-hole can match with a second positioning semi-hole on the crankshaft so as to form a complete positioning pin hole; this part is called as single throw.

Preferably, the first positioning semi-hole is specifically provided in a taper direction.

Preferably, there are two first positioning semi-holes.

Preferably, a structure for installing flywheel or other power output connection components is provided on an outer end face of the single throw main journal.

Preferably, between the single throw main journal and the crank pin is a first crank arm provided for connecting them.

Preferably, the first crank arm is coaxial with the single throw main journal and has a diameter slightly larger than that of the single throw main journal. Besides, a ring groove is provided at a projection portion in the direction towards the outer end face of the single throw main journal. The outer rabbet of the ring groove is under cut. The ring groove is called as oil slinger; an oil passage is provided at the bottom of the ring groove and extended from the inside of the crank pin to an oil orifice of the surface of the crank pin.

Preferably, the axis of the first crank arm coincides with that of the single throw main journal.

Preferably, the axis of the first crank arm is provided eccentrically relative to that of the single throw main journal, and on a side away from the axis of the crank pin.

Preferably, when the crankshaft is used in a single-cylinder engine, a toothed segment including at least two teeth is provided on the crank pin. The toothed segment matches with a corresponding internal toothed segment on the piston. A projection portion is provided on the crank pin at a position symmetric with and toothed segment at an angle of 180° from the toothed segment.

Preferably, an antifriction boss is provided around the root portion of the crank pin.

Preferably, a threaded hole matching with a crank bolt is provided at the center of the front end face of the tapered end of the crank pin.

Preferably, the taper of the tapered end of the crank pin is within the taper range of self locking.

A part for crankshaft of an internal combustion engine or compressor includes a crank main journal, wherein a tapered hole matching with a tapered end of a crank pin is provided on the crank main journal; the axis of the tapered hole is parallel with the axis of the crank main journal and is offset relative to the axis of the crank main journal; on the inside diameter surface of the taper hole, a second positioning semi-hole which corresponds to a first positioning semi-hole on a single throw matching therewith is provided from the small diameter end face or the large diameter end face; the second positioning semi-hole can form a complete positioning pin hole after combining the single throw with the part; the part is called as crank.

Preferably, the crank is provided on its inner end face facing the crank pin with a second crank arm.

Preferably, a crank bolt installation space is provided on the crank; upon installation, a crank bolt is used to lock up the crank and the crank pin after they insertedly fit with each other.

Preferably, a structure for installing flywheel or other power output connection components is provided on an outer end face of the crank.

Preferably, several weight-reducing holes are provided on the crank.

Preferably, an antifriction boss is provided on the inner end face of the crank centering on the position of contact between the crank pin and the crank.

The invention provides a crankshaft of an internal combustion engine or compressor, the crankshaft includes a single throw and a crank matching with each other; the single throw is that provided by any of the preceding technical solutions; the crank is that provided by any of the preceding technical solutions; upon assembly of the crankshaft, the crank insertedly fits with the tapered end on the front end of the crank pin of the single throw using a tapered hole of the crank, and a positioning pin is inserted into a pin hole formed by a first positioning semi-hole and a second positioning semi-hole corresponding with each other, so as to ensure that the axis of the crank main journal coincides with that of the single throw main journal and is parallel with the center line of the crank pin.

The invention also provides a part for crankshaft of an internal combustion engine or compressor, the part including a first crank pin, a double throw main journal and a second crank pin; wherein the first crank pin and the second crank pin extend from left and right end faces of the double throw main journal respectively; both the front ends of the first crank pin and the second crank pin are tapered ends; at least one first positioning semi-hole is provided on the circumferences of the tapered ends of the first crank pin and the second crank pin respectively; the first positioning semi-hole can match with a corresponding second positioning semi-hole on the crank or a crank single throw to form a complete positioning pin hole; the perpendicular distances from the axes of the two crank pins to the axis of the main journal are equal; this part is called as double throw.

Preferably, both the diameters of the first crank pin and the second crank pin are smaller than that of the double throw main journal, and a line for connecting an axle center of the first crank pin and a axle center of the double throw main journal forms an angle of 0-180° with a line for connecting an axle center of the second crank pin and the axle center of the double throw main journal.

The invention also provides a part for crankshaft of an internal combustion engine or compressor, including two portions of a crank single throw main journal and a crank pin; the crank pin extends out perpendicularly to the crank single throw main journal and has an axis that is offset from the axis of the crank single throw main journal; a front end that is tapered, at least one first positioning semi-hole is provided on the circumference of the tapered end; the first positioning semi-hole can match with a corresponding second positioning semi-hole provided on a crank or a crank single throw to form a complete positioning pin hole; a tapered hole is provided on the end face of the crank single throw main journal that faces away from the crank pin; at least one second positioning semi-hole is provided on an inside diameter surface of the tapered hole; the distance from the axis of the tapered hole to the axis of the crank single throw main journal is equal to the distance from the axis of the crank pin to the axis of the single throw main journal of crank; the second positioning semi-hole matches with the corresponding first positioning semi-hole on the crank pin of the single throw or double throw crankshaft to form a complete positioning pin hole; this part is called as single throw of crank.

The invention provides a crankshaft of an internal combustion engine or compressor which includes at least one double throw according to preceding technical solutions and one crank matching therewith.

The invention provides another crankshaft of an internal combustion engine or compressor which at least comprises one aforementioned double throw, one aforementioned single throw of crank and a crank matching with the crank pin of the aforementioned crank single throw or the double throw.

The invention provides an internal combustion engine employing a crankshaft according to any of the preceding technical solutions.

The invention provides a compressor employing a crankshaft according to any of the preceding technical solutions.

As compared to the prior art, the single throw or double throw provided by the invention each has a crank pin which is open at one end, so that the circular slide block can be installed directly on the crank pin. Further, through a combination with a crank or a crank single throw, etc, a complete crankshaft can be formed. The crankshaft formed by such a combination is easy to manufacture. Moreover, the relative angular relationships among various parts can be easily determined by a positioning pin hole which is formed by a combination of the first and second positioning semi-holes drilled correspondingly in process. The phase relationships among various parts remain unchanged after they are disassembled and re-assembled. The circular slide block can be conveniently inserted into the crank pin before assembling the crankshaft. Therefore, the crankshaft formed by such a combination results in a very easy assembly of the internal combustion engine or compressor.

BRIEF DESCRIPTION OF THE DRAWINGS

FIG. 1-A is a front view of a single throw of a modular crankshaft provided by a first embodiment of the invention;

FIG. 1-B is a right side view of the single throw of the modular crankshaft provided by the first embodiment of the invention;

FIG. 1-C is a front view of a crank of the modular crankshaft provided by the first embodiment of the invention;

FIG. 1-D is a left side view of the crank of the modular crankshaft provided by the first embodiment of the invention;

FIG. 1-E is a front view of the modular crankshaft provided by the first embodiment of the invention after the crankshaft is combined;

FIG. 2-A is a front view of a single throw of a modular crankshaft provided by a second embodiment of the invention;

FIG. 2-B is a front view of the crank of the modular crankshaft provided by the second embodiment of the invention;

FIG. 2-C is a front view of the modular crankshaft provided by the second embodiment of the invention after the crankshaft is combined;

FIG. 3-A is a front view of a single throw of a modular crankshaft provided by a third embodiment of the invention;

FIG. 3-B is a right side view of the single throw of the modular crankshaft provided by the third embodiment of the invention;

FIG. 3-C is a front view of the crank of the modular crankshaft provided by the third embodiment of the invention;

FIG. 3-D is a left side view of the crank of the modular crankshaft provided by the third embodiment of the invention;

FIG. 3-E is a front view of the modular crankshaft provided by the third embodiment of the invention after the crankshaft is combined;

FIG. 4-A is a front view of a double throw of a modular crankshaft provided by a fourth embodiment of the invention;

FIG. 4-B is a left side view of the double throw of the modular crankshaft provided by the fourth embodiment of the invention;

FIG. 4-C is a front view of a single throw of the modular crankshaft provided by the fourth embodiment of the invention;

FIG. 4-D is a right side view of the single throw of the modular crankshaft provided by the fourth embodiment of the invention;

FIG. 4-E is a front view of a crank of the modular crankshaft provided by the fourth embodiment of the invention;

FIG. 4-F is a left side view of the crank of the modular crankshaft provided by the fourth embodiment of the invention;

FIG. 4-G is a schematic view of the modular crankshaft provided by the fourth embodiment of the invention after the crankshaft is combined.

DETAILED DESCRIPTION OF THE INVENTION

The first embodiment of the invention provides a modular crankshaft of a miniature two-stroke single-cylinder engine. The modular crankshaft includes a single throw and a crank which is combined therewith, both of which are assembled together to form a complete crankshaft. FIG. 1 illustrates this modular crankshaft, wherein FIG. 1-A is a front view of the single throw of the modular crankshaft, FIG. 1-B is a right side view of the single throw shown in FIG. 1-A, FIG. 1-C is a front view of the crank of the modular crankshaft, FIG. 1-D is a left side view of the crank of the modular crankshaft, and FIG. 1-E is a front view of the modular crankshaft after being combined.

Reference is now made to FIG. 1-A. The single throw of the modular crankshaft includes three portions having axes in parallel with each other and connected in the following order: a single throw main journal 5, a first crank arm 22 and a crank pin 21. All of the three portions are cylindrical and have diameters different from each other.

The single throw main journal 5 is located at one end of the single throw. The single throw main journal 5, together with a crank main journal 13, supports the modular crankshaft so as to provide a rotation axle center for the modular crankshaft; as shown in FIG. 1-B, an outer end face of the single throw main journal 5 is provided with several threaded holes 12 for installing flywheel or other power output connection components (not shown). The outer end face of the single throw main journal 5 refers to the end face of the main journal 5 which is away from the crank pin 21 and faces the end face outside the crankshaft during the operation.

The first crank arm 22 is coaxial with the single throw main journal 5 and has a diameter slightly larger than that of the single throw main journal 5. Besides, a ring groove is provided at a projection portion in the direction towards the outer end face of the single throw main journal 5. The outer rabbet 411 of the ring groove inclines inwardly. The ring groove is called as oil slinger 4.

The crank pin 21 is a cylinder that has a diameter smaller than that of the single throw main journal 5, and extends perpendicularly from the outer end face of the first crank arm 22. The axis of the crank pin 21 is offset to one side relative to a common axis of the single throw main journal 5 and the first crank arm 22. A toothed segment 7 including three teeth is provided on the outer periphery of the crank pin 21. A projection portion 20 is provided at a position forming an angle of 180° with the toothed segment 7. The front end of the crank pin 21 is a tapered end 9. A central hole 11 with a fine thread is provided axially at the center of the front end face of the tapered end 9. From the front end face of the tapered end 9, two first positioning semi-holes 10-1 which extend in the tapering direction are provided along the outer peripheral surface of the tapered end 9. The first positioning semi-holes 10-1 may also begin from the large diameter end of the tapered end 9 and extend in the taper direction along its circumferential surface. The first positioning semi-holes 10-1 combine with second positioning semi-holes provided on the crank forms a complete positioning pin holes. An oil passage 6 is provided inside the pin body of the crank pin 21. One end of the oil passage 6 opens into the groove bottom of the oil slinger 4, and the other end thereof opens into an oil orifice 8 on the surface of the crank pin 21.

Reference is now made to the crank shown in FIG. 1-C. The crank comprises two portions connected axially in a straight line: a crank main journal 13 and a second crank arm 18. On the side where the axis position is offset from the axis of the crank main journal 13, a tapered hole 15 is provided that matches with the taper of the tapered end 9 of the crank pin 21. On an outer end face of the crank main journal 13 that faces away from the crank pin 21, a crank bolt installation space 14 is provided. This space is provided on the small end of the tapered hole 15 with a plane surface 151. The crank bolt 17, after screwed into the central hole 11, presses against this plane surface 151 to provide a pressing force. An inner hole circular stop rabbet (not shown) is also provided on this space to locate magneto shaft when installing it. A threaded hole 3 for fixing the magneto shaft is also provided on the end face. Two second axial positioning semi-holes 10-2 are provided on the inside diameter face of the tapered hole 15 from the small diameter end face thereof in the taper direction of the tapered hole 15 (assuming that the first positioning semi-hole 10-1 matching with the second positioning semi-hole 10-2 begins from the small diameter end of the tapered end 9). The second positioning semi-holes 10-2 form complete circular holes (called positioning pin hole), combined with the first positioning semi-holes 10-1 on the tapered end 9 of the crank pin. Moreover, when the strength and rigid requirements are met, several weight-reducing holes 2 can also be provided on the crank.

The crank and single throw above described can be combined to form a modular crankshaft. Firstly, a circular slide block is disposed to fit over the crank pin 21 and a crankshaft gasket is used to adjust axial clearance. Then, the crank is inserted into the crank pin by matching the tapered hole 15 with the tapered end 9 of the crank pin 21 and is adjusted by rotation in such a way that the first positioning semi-holes 10-1 and the second positioning semi-holes 10-2 which are symmetric engage with each other to form the complete circular positioning pin holes. The circular positioning pin holes have an opening at the side of the small diameter end of the tapered end 9. The beams of the two positioning pins are inserted into the positioning pin holes from the openings to realize a positioning of the crank and the single throw in the angular relationship therebetween. If the first positioning semi-holes 10-1 on the tapered end 9 of the crank pin begin from the large diameter end, the second positioning semi-holes 10-2 begin from the large diameter end face of the tapered hole 15 so that the opening of the positioning pin holes after the combination is on the large diameter end face and the beam of the positioning pin can also be inserted into the positioning pin hole through this opening. Finally, the crank bolt 17 is screwed into the central hole 11. The crankshaft and crank are pressed by a pre-tightening force. As such, the complete crank-circular slide block assembly is formed.

Some technical features of the modular crank are described as follows.

It is required that after the modular crank is assembled, the axis of the crank main journal 13 coincides with that of the single throw main journal 5 and the axis of the crank pin is parallel with that of the main journal so that the modular crankshaft can operate normally. The combination of the two first positioning semi-holes 10-1 and two second positioning semi-holes 10-2 can realize an accurate positioning of the crank and the single throw to ensure the above described geometric relationship after the positioning pin is inserted. Furthermore, the above structure in which the beam of the positioning pin connects two positioning semi-holes can also play the role of transmitting partial action force. In this embodiment, the first positioning semi-holes 10-1 and second positioning semi-holes 10-2 are provided in two pairs, This number is quite reasonable. In fact, provision of only one pair of the first positioning semi-holes 10-1 and second positioning semi-holes 10-2 that match with each other can also perform the essential positioning function. However, as compared with this embodiment in which two pairs of the first positioning semi-holes 10-1 and second positioning semi-holes 10-2 match with each other, the positioning accuracy is poor due to the restriction by fit tolerance between the positioning pin hole and the positioning pin, and the effect of transmitting action force is slightly poorer.

The structure of positioning semi-hole is particularly described herein by taking the first positioning semi-hole 10-1 as an example. The first positioning semi-hole 10-1 is a recess that extends in the taper direction on the outer conical surface of the crank pin 21 of the single throw, and its cross section is a part of circle, which can be a semi-circle, or greater than or smaller than a semi-circle as long as it matches with the corresponding second positioning semi-hole 10-2 on the inside diameter surface of the tapered hole 15 of the crank so as to form a complete cylindrical hole in the said cross section. The positioning semi-hole is acquired by fitting the tapered end 9 of the single throw crank pin with the tapered hole 15 of the crank and then drilling the intersection therebetween. Of course, the separate milling process is not excluded. Generally, the first positioning semi-hole 10-1 and the second positioning semi-hole 10-2 will only extend by a distance along the conical surface and will not reach the other end face of the cone. Thus, the positioning pin hole is a blind hole.

In the modular crankshaft, the taper of tapered face 9 of the crank pin 21 and the taper of the tapered hole 15 are small and within the range of self-locking. Therefore, in case that the crank bolt 17 is loosened, the crank pin 21 and crank will not be loosened during motion.

The oil slinger 4 is a special design for the modular crankshaft. Oil mist exists in the cylinder block of engine. When the oil slinger rotates at a high speed, the oil will accumulate in the groove of the oil slinger under the action of centrifugal force and flow through the oil passage 6 and oil orifice 8 to the position where the circular slide block bearing contacts the crank pin 21 so as to provide lubrication oil for the modular crankshaft.

The toothed segment 7 is a special design for the modular crankshaft used for single-cylinder engine. The purpose of the toothed segment 7 is to overcome the problem of active point. The toothed segment 7 cooperates with an internal toothed segment on the piston at a gear ratio of 2:1. When the piston moves, the modular crankshaft will be poked by a periodic cooperation of the two toothed segments so that it passes through the active point. A projection portion 20 is provided corresponding to the toothed segment 7. The projection portion 20 cooperates with the toothed segment 7 so that after the installation is completed, the crankshaft gasket will stably abut against an end face of the projection portion 20 that faces the crank so as to improve the stress state of the crankshaft gasket in motion.

The second embodiment of the invention provides a modular crankshaft used for a three-cylinder air compressor. The modular crankshaft comprises a single throw and a crank to be combined with the single throw, both of which are assembled together to form a complete crankshaft. FIG. 2 illustrates this modular crankshaft, wherein FIG. 2-A is a front view of the single throw of the modular crankshaft, FIG. 2-B is a front view of the crank of the modular crankshaft, and FIG. 2-C is a front view of the modular crankshaft after being combined.

Reference is now made to FIG. 2-A. The single throw of the modular crankshaft includes three portions having axes in parallel with each other and connected in the following order: a single throw main journal 28, a first crank arm 29 and a crank pin 31. The structure of the single throw is substantially the same as that in the above-described first embodiment, and only the difference therebetween will be described below.

As shown in FIG. 2-A, a circular boss, called antifriction boss 30, is provided at the position where the first crank arm 29 of the single throw contacts the root of the crank pin 31. The antifriction boss 30 is disposed around the root of the crank pin 31. The antifriction boss 30 is subject to fine machining and heat treatment for reducing abrasion in cooperation with crankshaft gasket. Thus, it is not required to machine and treat the entire crank arm plane and manufacture cost can be reduced. FIG. 2-A also shows that no toothed segment is provided on the crank pin 31. This is because this crankshaft is used for a multi-cylinder machine without the active point problem. Also, no oil slinger is provided on the single throw.

At the bottom of the central hole 35 of the single throw, a main oil passage 36 is axially provided. Several oil orifices 32 that lead to the main journal 28 and the outer periphery surface of the crank pin 31 are in communication with the main oil passage 36 so that the above-described oil path can provide lubrication oil to various bearings.

An antifriction boss 27 is also provided on the crank of the modular crankshaft at the location facing the single throw.

The combination manner of the modular crankshaft is the same as that of the first embodiment. Since the modular crankshaft is used for a three-cylinder air compressor, two circular slide blocks need to be installed on the crank pin.

The third embodiment of the invention provides a modular crankshaft used for a gasoline engine having a displacement of 2.0 liter. Three circular slide blocks need to be used in the engine. The modular crankshaft also includes a single throw and a crank to be combined with the single throw, both of which are modular together to form a complete crankshaft. FIG. 3 illustrates such a modular crankshaft, wherein FIG. 3-A is a front view of the single throw of the modular crankshaft, FIG. 3-B is a right side view of the single throw shown in FIG. 3-A, FIG. 3-C is a front view of the crank of the modular crankshaft, FIG. 3-D is a left side view of the crank of the modular crankshaft, and FIG. 3-E is a front view of the modular crankshaft after being combined. This embodiment is substantially the same as the first embodiment, and only the difference therebetween will be described below.

In the above described first embodiment and second embodiment, the axis of the single throw main journal coincides with that of the first crank arm, and the axis of the crank pin does not lie in the same axis with the crankshaft rotation axis determined by the crank main journal and the single throw main journal. In this arrangement, when the modular crankshaft rotates, the crank pin will produce a centrifugal force, making the stress of the bearing supporting the main journal change periodically and thus affecting the life span. In view of this problem, in the embodiment, the crank arm is arranged to be an eccentric structure relative to the rotation axis of the crankshaft. As shown in FIG. 3-A, the single throw of the modular crankshaft also comprises a single throw main journal 39, a first crank arm 42 and a crank pin 46, wherein the axis M-M of the first crank arm 42 does not coincide with the axis L-L (namely, the crankshaft rotation axis) of the single throw main journal 39 and lies on the side that is away from the axis N-N of the crank pin. Ideally, the above three axes are coplanar and in parallel with each other. The axis of the crank pin 46 and the axis of the first crank arm 42 lie on both sides of the axis of the single throw main journal 39 respectively. The eccentric relationship between the first crank arm 42 and the single throw main journal 39 can be seen from FIG. 3-B.

Likewise, the axes of the crank main journal and the second crank arm of the modular crankshaft also have the above-described positional relationship.

The advantage of the above eccentric structure lies in that, when the modular crankshaft rotates, it rotates about a crankshaft rotation axis commonly formed by the main axis of the crank main journal and the main axis of the single throw main journal, and the rotation centroid of the first crank arm and the second crank arm and the rotation centroid of the crank pin lie on different sides of the crankshaft rotation axis. The centrifugal force generated by the first crank arm and the second crank arm offsets the centrifugal force generated by the crank pin so that the periodic variation amplitude of stress on the bearing supporting the crank main journal and the single throw main journal can be reduced, which is beneficial for prolonging the life span of engine.

In the third embodiment, it is also shown that a ring groove is provided on the single throw main journal 39 to serve as an oil groove 40. Meanwhile, oil orifices 41 that communicate the oil groove 40 with the main oil passage 44 are provided. Through this structure, lubrication oil can be fed into the main oil passage 44 from the oil groove 40. Besides, an inclined oil orifice 47 that communicates the surface of a cone 48 on the front end of the crank pin 46 with the main oil passage 44 is provided on the cone 48; an oil orifice 60 that communicates the surface of the crank main journal 52 and the inside diameter surface of the tapered hole 59 is provided on the crank. As shown in FIG. 3-E, when the assembly is completed, the inclined oil orifice 47 cooperates with the oil orifice 60 so as to feed oil to the bearing of the crank main journal 52.

In the above-described three embodiments, all the modular crankshafts are formed by a combination of a single throw and a crank. However, when the power of the engine or compressor increased, the engine will not operate normally if two main journals are used to support the crankshaft. In this situation, a modular crankshaft having a plurality of main journals is required. Under this circumstance, a modular crankshaft formed by a single throw, a double throw and a crank is required to be used. The fourth embodiment of the invention provides an embodiment of such a modular crankshaft.

FIG. 4 illustrates an modular crankshaft used for a two-stroke diesel engine having a power of 600 KW. Such an modular crankshaft is a four throw crankshaft formed by a combination of a double throw, two crank single throws and two cranks, wherein FIG. 4-A is a front view of the double throw of the modular crankshaft, FIG. 4-B is left side view of the double throw of the modular crankshaft; FIG. 4-C is a front view of the crank single throw of the modular crankshaft; FIG. 4-D is a right side view of the crank single throw of the modular crankshaft; FIG. 4-E is a front view of the crank of the modular crankshaft; FIG. 4-F is a left side view of the crank of the modular crankshaft; and FIG. 4-G is a schematic view of the modular crankshaft after the combination of the crankshaft is completed.

Reference is now made to FIG. 4-A, which is a front view of the double throw 101 of the modular crankshaft. The double throw 101 comprises a first crank pin 64, a double throw main journal 70 and a second crank pin 72. No dedicated crank arm is provided and it is the double throw main journal 70 that performs the function of the crank arm. This structure in which no crank arm is provided can actually be applied to the situation of the above first to third embodiments, wherein the first crank pin 64 and the second crank pin 72 extend perpendicularly from the left and right end faces of the main journal 70 respectively. Both the diameters of the first crank pin 64 and the second crank pin 72 are smaller than that of the double throw main journal 70. Moreover, as shown in FIG. 4-B, the axle centers of the first crank pin 64 and the second crank pin 72 are respectively located on two diameters of the main journal 70 that form an angle of 90°. Besides, the respective distances between their axle centers and the axle center of the main journal 70 equal to each other and the outer edge of the first crank pin 64 and the second crank pin 72 are located within the circumference of the double throw main journal 70. Actually, the geometrical relationship between the first crank pin 64 and the second crank pin 72 and the main journal 70 can be different from that in this embodiment as required. For example, the lines connecting the two axle centers to the axis centers of the main journal 70 can vary within the range of 0-180° therebetween. A tapered end 61 is provided at the front end of the first crank pin 64, and a tapered end 76 is provided at the front end of the second crank pin 72. A first antifriction boss 67 is provided at a location where the root of the first crank pin 64 couples the end face of the double throw main journal 70; a second antifriction boss 71 is provided at a location where the root of the second crank pin 72 couples the end face of the double throw main journal 70. The arrangement and functions of the first antifriction boss 67 and the second antifriction boss 71 are the same as those in the second and third embodiments. A ring groove is provided on the outer peripheral surface of the main journal 70 at an axially central position to serve as an oil groove 69. The oil groove 69 communicates with a first main oil passage 66 of the first crank pin 64 and a second main oil passage 74 of the second crank pin 72 so as to feed lubrication oil to the bearing of the double throw main journal. The first main oil passage 66 and the second main oil passage 74 are respectively provided along the axes of the first crank pin 64 and the second crank pin 72, and communicate respectively with the first crank pin oil orifice 65 and the second crank pin oil orifice 73 that lead to the installation positions of various circular slide blocks of the engine. Besides, as in the case of the first to third embodiments, two first positioning semi-holes 62, 75 are respectively provided on the outer peripheral surfaces of tapered ends of two crank pins. The first positioning semi-holes combines with the second positioning semi-holes provided on the crank or crank single throw to form a complete positioning pin hole; central holes 63, 77 that cooperate with crank bolt are provided.

FIG. 4-C illustrates a schematic view of the crank single throw of the modular crankshaft. The difference of this crank single throw from that in the above first to third embodiments lies in that the end face of the crank single throw main journal 86 of this crank single throw needs to match with a tapered end of the crank pin of the double throw when in combination. Namely, the crank single throw main journal 86 also serves as the crank. For this purpose, a tapered hole 88 is provided on the end face of the crank single throw main journal 86. A second positioning semi-hole 89 is provided on the inside diameter surface of the tapered hole 88. Other corresponding structures such as bolt installation space 87 are also provided. The second positioning semi-hole 89 corresponds to the first positioning semi-hole 62 or 75 on the crank pin of the double throw so as to form a complete positioning pin hole; the tapered hole 88 corresponds to the tapered end on the front end of the crank pin of the double throw. This arrangement enables the crank single throw to match with the crank pin of the double throw. FIG. 4-D is a right side view of the crank single throw, in which the positional relationship between the tapered hole 88 and the crank pin 82 is shown. The tapered hole 88 and the crank pin 82 lie on both sides of the axis of the crank single throw main journal 86 and form an angle of 180°. The distances between the axes of the tapered hole 88 and the crank pin 82 and the axis of main journal are equal. Other structures of this crank single throw are the same as those in the above first to third embodiments. However, the crank arm is also not provided and no detailed discussion in given herein.

FIG. 4-E illustrates the structure of the crank of this modular crankshaft. This crank matches with the crank pin of the crank single throw when in combination. This crank is not provided with a dedicated crank arm. Other parts are the same as those of the crank provided by the first embodiment of the invention, including a tapered hole 94 cooperating with the crank pin taper of the crank single throw, two second positioning semi-holes 95 matching with corresponding first positioning semi-holes on the crank pin of crank single throw, and crank bolt installation space 90. FIG. 4-F also illustrates that on the outer end face of the crank, several threaded holes 96 are provided for connecting power output shaft.

Reference is now made to FIG. 4-G, which illustrates various parts of the modular crankshaft after they are combined together. The double throw 101 is connected at an intermediate position of the modular crankshaft. A first crank pin 100 of the double throw 101 cooperates with a crank single throw main journal of a first crank single throw 98, a second crank pin 102 of the double throw 101 cooperates with a crank single throw main journal of a second crank single throw 103. The crank pin of the first crank single throw 98 matches with the first crank 97, and the crank pin of the second crank single throw 103 matches with the second crank 104.

In the above-described cooperation relationship, the angular relationship between the two crank pins of the double throw 101 is determined by the design of the double throw 101 itself; the angular relationship between the crank pin and the crank single throw can be determined by inserting a positioning pin into a complete positioning pin hole which is formed by a combination of corresponding first positioning semi-hole and second positioning semi-hole between the two crank pins of the double throw 101 and the crank single throw main journal; similarly, between the crank pin of the first crank single throw 98 and the first crank 97, a positioning is achieved by inserting a positioning pin into a complete positioning pin hole formed by a combination of corresponding first positioning semi-hole and second positioning semi-hole; a positioning is also achieved in the above manner between the crank pin of the second crank single throw 103 and the second crank 104. After the above parts are combined together, a crank bolt is further required to lock up these parts. The axes of various main journals of the finally formed modular crank lie on the same straight line. Various crank pins form a certain angle with each other in space, namely, there appear several throws. The final modular crankshaft is a four-throw crankshaft. Each crank pin is provided with a circular slide block.

The above fourth embodiment provides an example of a modular crankshaft which is formed by a flexible combination of a double throw, a crank single throw and a crank. The key feature thereof lies in that a tapered hole matching with a tapered face of crank pin of the double throw as well as a corresponding positioning pin hole are provided on the main journal of the crank single throw so that the crank single throw can simultaneously serve as the crank. Actually, the combination mode of the double throw, the crank single throw, the single throw and the crank is very flexible. Various combinations of the above parts can be made according to the enlightenment provided by the above embodiments so as to achieve various modular crankshaft.

In any of the above-described embodiments, the angular fitting relationships between the crank pin and crank or between the crank pin of the double throw and corresponding crank single throw main journal are all ensured by connecting positioning pins of positioning semi-holes which match with each other, so that in the course of combination, the parts can conveniently form a crankshaft that meets the design requirements. The positioning semi-holes which correspond to each other are acquired by matching drilling in technology. In the above-described embodiments, each crank and crank pin are provided with two pairs of positioning semi-holes which match with each other to form two positioning pin holes. This number of positioning pin hole is the optimal design scheme. Actually, more than two pairs of positioning semi-holes can be provided as required to form more than two positioning pin holes, which could also bring about a well positioning effect. Even using just one pair of positioning semi-holes to form one positioning pin hole can also perform the positioning function. However, in this case, the positioning accuracy is somewhat lower and it only applies to applications with low demands.

Besides, it is preferred that the above positioning semi-holes are provided in parallel with the taper direction of the tapered end of the crank pin or the taper direction of the tapered hole of the crank. This arrangement facilitates processing. However, they can also be provided in parallel with axes of the crank and crank pin or in other directions, as long as the first positioning semi-holes and the corresponding second positioning semi-holes can form complete positioning pin holes and positioning pins can be conveniently inserted so that the positioning of relative positional relationships of the crank, the crank pin, etc can be achieved. The two positioning semi-holes which match with each other do not necessarily assume just one half of the positioning pin hole respectively.

When the above-described various modular crankshaft are applied to an internal combustion engine or compressor, an internal combustion engine or compressor using the modular crankshaft is acquired.

Described above are only preferred embodiments of the invention. It is noted that it is obvious to those skilled in the art, under the premise of not departing the principle of the invention, to make a number of modifications and variations which should also be considered as falling within the scope of protection of the invention.

The invention claimed is:

1. A part for a crankshaft of an internal combustion engine or a compressor, comprising two portions: a single throw main journal and a crank pin, wherein the crank pin extends out perpendicularly to the single throw main journal, the axis of the crank pin is offset relative to the axis of the single throw main journal, the front end of the crank pin is tapered, at least one first positioning semi-hole is provided on a conical surface of the tapered end, starting from a small diameter end or a large diameter end, the at least one first positioning semi-hole matches with a second positioning semi-hole on a crank which is operated in combination with the part to form a complete positioning pin hole; said part is structured as a single throw;

wherein a first crank arm for connecting the single throw main journal and the crank pin is provided there between; and the first crank arm is coaxial with the single throw main journal and has a diameter larger than that of the single throw main journal, a ring groove is provided at a projection portion in the direction towards the outer end face of the single throw main journal, an outer rabbet of the ring groove is under cut, the ring groove is structured as oil slinger; an oil passage is provided at the bottom of the ring groove and extends from the inside of the crank pin to an oil orifice of the surface of the crank pin.

2. The part for a crankshaft of an internal combustion engine or a compressor of claim 1, wherein the first positioning semi-hole is provided along a taper direction, and there are two of said first positioning semi-holes.

3. The part for a crankshaft of an internal combustion engine or a compressor of claim 1, wherein threaded holes for installing flywheel or power output connection components are provided on an outer end face of the single throw main journal.

4. The part for a crankshaft of an internal combustion engine or a compressor of claim 1, wherein the axis of the first crank arm is arranged in such a manner that the axis of the first crank arm coincides with that of the single throw main journal or the axis of the first crank arm is provided eccentrically relative to the axis of the single throw main journal, and is located on a side away from the axis of the crank pin.

5. The part for a crankshaft of an internal combustion engine or a compressor of claim 1, a toothed segment including at least two teeth is provided on the crank pin, and a projection portion is provided on the crank pin at a position symmetric with and at an angle of 180° from the toothed segment.

6. The part for a crankshaft of an internal combustion engine or a compressor of claim 1, wherein a threaded hole matching with a crank bolt is provided at the center of the front end face of the tapered end of the crank pin.

7. The part for a crankshaft of an internal combustion engine or a compressor of claim 1, wherein the taper of the tapered end of the crank pin is within the taper range of self locking.

8. A part for a crankshaft of an internal combustion engine or a compressor, comprising a crank main journal, wherein a tapered hole matching with a tapered end of a crank pin is provided on the crank main journal; the axis of the tapered hole is parallel with the axis of the crank main journal and is offset relative to the axis of the crank main journal; a second positioning semi-hole which corresponds to a first positioning semi-hole on a single throw matching therewith is provided on the inside diameter face of the tapered hole, starting from the small diameter end face or the large diameter end face; the second positioning semi-hole forms a complete positioning pin hole after the single throw is combined with the part; this part is structured as a crank;

a crank bolt installation space is provided on the crank and the space is provided on a small end of the tapered hole with a plane surface, and a crank bolt presses against the plane surface to provide a pressing force, after screwed into a central hole; upon installation, the crank bolt is used to lock up the crank and the crank pin after the crank and the crank pin insertedly fit with each other.

9. The part for a crankshaft of an internal combustion engine or a compressor of claim 8, wherein the crank is provided on its inner end face facing the crank pin with a second crank arm.

10. The part for a crankshaft of an internal combustion engine or a compressor of claim 8, wherein threaded holes for installing flywheel or power output connection components are provided on an outer end face of the crank.

11. A crankshaft of an internal combustion engine or a compressor, comprising a single throw and a crank matching with each other, wherein the single throw comprises two portions: a single throw main journal and a crank pin, wherein the crank pin extends out perpendicularly to the single throw main journal, an axis of the crank pin is offset relative to an axis of the single throw main journal, the front end of the crank pin is tapered, at least one first positioning semi-hole is provided on a conical surface of the tapered end, starting from a small diameter end or a large diameter end, the at least one first positioning semi-hole matches with a second positioning semi-hole provided on the crank and operated in combination with the single throw to form a complete positioning pin hole; wherein a first crank arm for connecting the single throw main journal and the crank pin is provided there between; the first crank arm is coaxial with the single throw main journal and has a diameter larger than that of the single throw main journal, a ring groove is provided at a projection portion in the direction towards the outer end face of the single throw main journal, an outer rabbet of the ring groove is under cut, the ring groove is structured as oil slinger; an oil passage is provided at the bottom of the ring groove and extends from the inside of the crank pin to an oil orifice of the surface of the crank pin;

the crank comprises a crank main journal, wherein a tapered hole matching with a tapered end of a crank pin is provided on the crank main journal; the axis of the tapered hole is parallel with the axis of the crank main journal and is offset relative to the axis of the crank main journal; a second positioning semi-hole which corresponds to a first positioning semi-hole on the single throw matching therewith is provided on the inside diameter face of the tapered hole, starting from the small diameter end face or the large diameter end face; the second positioning semi-hole forms a complete positioning pin hole after the single throw is combined with the crank; a crank bolt installation space is provided on the crank and the space is provided on a small end of the tapered hole with a plane surface, and the crank bolt presses against the plane surface to provide a pressing force, after screwed into a central hole; upon installation, a crank bolt is used to lock up the crank and the crank pin after the crank and the crank pin insertedly fit with each other;

upon assembly of the crankshaft, the crank insertedly fits with the tapered end on the front end of the crank pin of the single throw using a tapered hole of the crank, and a positioning pin is inserted into a corresponding pin hole formed by a combination of a first positioning semi-hole and a second positioning semi-hole corresponding with each other, so as to ensure that the axis of the crank main journal coincides with the axis of the single throw main journal and is parallel with the center line of the crank pin.

* * * * *